(12) United States Patent
Nagai et al.

(10) Patent No.: US 7,141,443 B2
(45) Date of Patent: Nov. 28, 2006

(54) SEMICONDUCTOR WAFER DIVIDING METHOD UTILIZING LASER BEAM

(75) Inventors: Yusuke Nagai, Tokyo (JP); Satoshi Kobayashi, Tokyo (JP)

(73) Assignee: Disco Corporation, Tokyo (JP)

( * ) Notice: Subject to any disclaimer, the term of this patent is extended or adjusted under 35 U.S.C. 154(b) by 114 days.

(21) Appl. No.: 10/870,053

(22) Filed: Jun. 18, 2004

(65) Prior Publication Data
US 2005/0009301 A1 Jan. 13, 2005

(30) Foreign Application Priority Data
Jun. 26, 2003 (JP) ............... 2003-182150

(51) Int. Cl.
*H01L 21/00* (2006.01)
(52) U.S. Cl. .................. 438/33; 438/68; 438/111; 438/113; 438/114; 438/120; 438/461; 438/462; 438/463; 438/464; 438/465; 438/460; 438/458
(58) Field of Classification Search .................. 438/33, 438/66, 111, 120, 460–465, 458, FOR. 386, 438/FOR. 387
See application file for complete search history.

(56) References Cited

U.S. PATENT DOCUMENTS 3,112,850 A * 12/1963 Garibotti ............... 225/2
5,826,772 A    10/1998 Ariglio et al.
6,211,488 B1    4/2001 Hoekstra et al.
6,236,446 B1    5/2001 Izumi et al.
6,562,698 B1 *  5/2003 Manor ................ 438/460
2003/0017663 A1 * 1/2003 Takyu et al. ........... 438/200

FOREIGN PATENT DOCUMENTS

EP    1 160 853 A2   12/2001
JP    2001-277163    10/2001
JP    2003-151921     5/2003

OTHER PUBLICATIONS

Austrian Patent Office Search Report via IPOS (Singapore).
Austrian Patent Office Examination Report via IPOS (Singapore).

* cited by examiner

*Primary Examiner*—George R. Fourson
*Assistant Examiner*—Thanh V. Pham
(74) *Attorney, Agent, or Firm*—Smith, Gambrell & Russell, LLP

(57) ABSTRACT

A method which can divide a semiconductor wafer sufficiently precisely along a street by use of a laser beam, while fully avoiding or suppressing contamination of circuits formed in rectangular regions on the face of the semiconductor water, and without causing chipping to the rectangular regions on the face. A laser beam is applied from beside one of the back and the face of a semiconductor substrate and focused onto the other of the back and the face of the semiconductor substrate, or the vicinity thereof, to partially deteriorate at least a zone ranging from the other of the back and the face of the semiconductor substrate to a predetermined depth.

10 Claims, 4 Drawing Sheets

SEMICONDUCTOR WAFER DIVIDING METHOD UTILIZING LASER BEAM

FIELD OF THE INVENTION

This invention relates to a method for dividing a semiconductor wafer along a street by use of a laser beam, the semiconductor wafer being composed of a semiconductor substrate on whose face a plurality of rectangular regions are demarcated by a plurality of the streets arranged in a lattice pattern, and a circuit is formed in each of the rectangular regions.

DESCRIPTION OF THE PRIOR ART

In the production of a semiconductor device, as is well known, the face of a semiconductor wafer composed of a semiconductor substrate, which can be formed from silicon, is partitioned into a plurality of rectangular regions by a plurality of streets arranged in a lattice pattern, and a circuit is formed in each of the rectangular regions. Then, the semiconductor wafer is divided along the streets to form a plurality of semiconductor devices. In recent times, various methods utilizing a laser beam have been proposed for dividing the semiconductor wafer along the streets.

U.S. Pat. No. 5,826,772 discloses a dividing method in which a laser beam is applied from the face side of a wafer such as a semiconductor substrate, and focused on the face, or its vicinity, of the wafer, and the wafer and the laser beam are relatively moved along a division line. By this action, the material for the wafer is melted away along the division line to form a groove along the division line on the face of the semiconductor substrate. Then, an external force is exerted on the wafer to break the wafer along the groove.

U.S. Pat. No. 6,211,488 and Japanese Patent Application Laid-Open No. 2001-277163 each disclose a dividing method which comprises applying a laser beam from the face side or back side of a wafer such as a semiconductor substrate, focusing the laser beam onto an intermediate portion in the thickness direction of the wafer, relatively moving the wafer and the laser beam along a division line, thereby generating an affected or deterioration zone (i.e. a crack zone, or a melting and resolidification zone), which extends along the division line, in the intermediate portion in the thickness direction of the wafer, and then exerting an external force on the wafer to break the wafer along the deterioration zone.

The method disclosed in the above-mentioned U.S. Pat. No. 5,826,772, when applied in dividing the semiconductor wafer along the street, may cause the material melted away on the surface of the street (so-called debris) to scatter over the rectangular regions, thereby contaminating the circuits formed there. Particularly in case a metal film (so-called teg film) or a low dielectric constant insulating film (so-called low-k film) for testing circuit characteristics is formed on the street, the material melted and removed is highly likely to contaminate the circuits.

The methods disclosed in the U.S. Pat. No. 6,211,488 and Japanese Patent Application Laid-Open No. 2001-277163, when applied in dividing the semiconductor wafer along the street, have the following problem: In the vicinity of the face and/or the back when viewed in the thickness direction of the semiconductor wafer, breakage does not proceed sufficiently precisely along the street, and this tends to cause chipping to the rectangular region divided from the wafer. Particularly if the semiconductor substrate is formed from a single crystal of silicon, and its face is in a crystal plane in the <100>-direction, a crystal plane in the <111>-direction, which has high cleavage properties, is present in directions at an angle of 56 degrees to crystal orientations defined by a (010)-plane and a (001)-plane as cutting planes. Thus, there is a strong tendency toward chipping due to breakage proceeding in the direction at the angle of 56 degrees to the cutting planes.

SUMMARY OF THE INVENTION

A principal object of the present invention is to provide a novel and improved method which can divide a semiconductor wafer sufficiently precisely along a street by use of a laser beam, while fully avoiding or suppressing the contamination of circuits formed in rectangular regions on the face of the semiconductor water, and without causing chipping to the rectangular regions on the face, and so on.

We, the inventors, conducted in-depth studies and experiments and, to our surprise, found the following facts: A laser beam is applied from beside one of the back and the face of a semiconductor substrate, and is focused onto the other of the back and face of the semiconductor substrate, or its vicinity. By so doing, at least a zone ranging from the other of the back and the face of the semiconductor substrate to a predetermined depth is deteriorated partially, whereby the above-mentioned principal object can be attained.

According to the present invention, as a method for attaining the above-described principal object, there is provided a dividing method for dividing a semiconductor wafer along a street, the semiconductor wafer being composed of a semiconductor substrate on whose face a plurality of rectangular regions are demarcated by a plurality of the streets arranged in a lattice pattern, and a circuit is formed in each of the rectangular regions, the dividing method comprising:

applying a laser beam from beside one of the back and the face of the semiconductor substrate and focusing the laser beam onto the other of the back and the face of the semiconductor substrate, or its vicinity, to partially deteriorate at least a zone ranging from the other of the back and the face of the semiconductor substrate to a predetermined depth;

relatively moving the semiconductor substrate and the laser beam along the street; and exerting an external force on the semiconductor substrate to break the semiconductor substrate along the street.

If the semiconductor substrate is formed from silicon, the deterioration may be substantially melting and resolidification. It is advantageous for the dividing method to include displacing the focused spot of the laser beam in the thickness direction of the semiconductor wafer to increase the thickness of the deterioration zone. If the thickness of the semiconductor substrate is assumed to be T, it is preferred to deteriorate a zone ranging from the other of the back and the face of the semiconductor substrate to a depth within the range of from 0.20 T to 0.50 T, and also deteriorate a zone ranging from the one of the back and the face of the semiconductor substrate to a depth within the range of from 0.20 T to 0.50 T. It is also possible to deteriorate the whole, in the thickness direction, of the semiconductor substrate. If the laser beam is applied from the back side of the semiconductor substrate and focused on the face of the semiconductor substrate or its vicinity, it is preferred that a protective tape formed from a plastic film be stuck to the face of the semiconductor substrate, and that the back of the semiconductor substrate be a mirror surface having a surface roughness Ra, as defined by JIS B0601, of 0.05 μm or less. If a laminated film, which is either a metal film or a low dielectric constant insulating film, is disposed in at least the street region on the face of the semiconductor substrate, the laminated film may also be deteriorated at least partially by the laser beam. Preferably, the laser beam is a pulse laser beam having a wavelength of 800 to 1,500 nm.

DETAILED DESCRIPTION OF THE PREFERRED EMBODIMENTS

Preferred embodiments of the present invention will now be described in greater detail by reference to the accompanying drawings.

Figure 1:
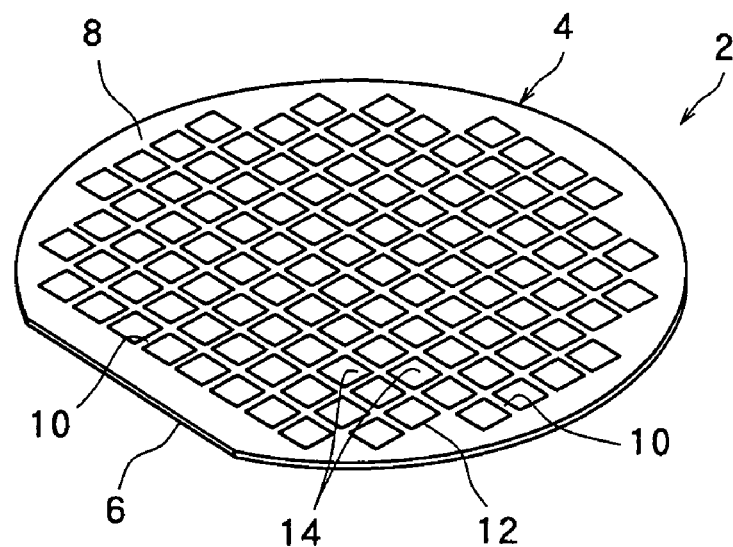
FIG. 1 is a perspective view showing a typical example of a semiconductor wafer to be divided by the method of the present invention.
Figure 2:
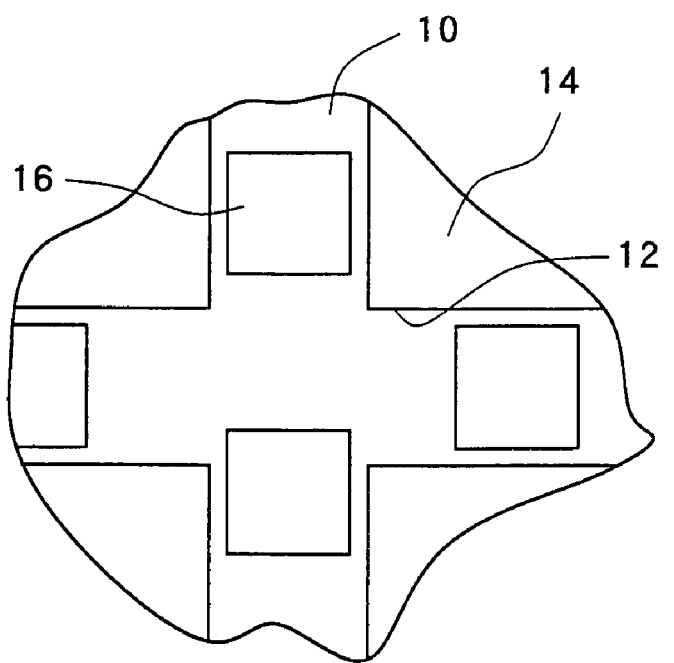
FIG. 2 is an enlarged partial view showing the face of the semiconductor wafer of FIG. 1.

FIG. 1 shows a typical example of a semiconductor wafer to be divided by the method of the present invention. The semiconductor wafer, entirely indicated at a numeral 2, is composed of a nearly disk-shaped semiconductor substrate 4 formed from silicon. In the semiconductor substrate 4, a straight edge 6, generally called an orientation flat, is formed. On the face 8 of the semiconductor substrate 4, a plurality of rectangular regions 12 are demarcated by a plurality of streets 10 arranged in a lattice pattern. Each of the streets 10 extends parallel to or perpendicular to the straight edge 6. With reference to FIG. 2 along with FIG. 1, a circuit 14 is disposed in each of the rectangular regions 12 (in FIG. 1, the circuit 14 is shown in a simplified manner). Metal films 16, which are used for a characteristics test of the circuit 14 and may be of a square or rectangular shape, are disposed at suitable intervals on the street 10. The metal film 16 is generally called a teg (test elements group) film. A low dielectric constant insulating film, called a low-k film, is often disposed on the face 8 of the semiconductor substrate 4 for the purpose of, for example, improving the processing capacity of the circuit, although such a film is not shown.

Figure 3:
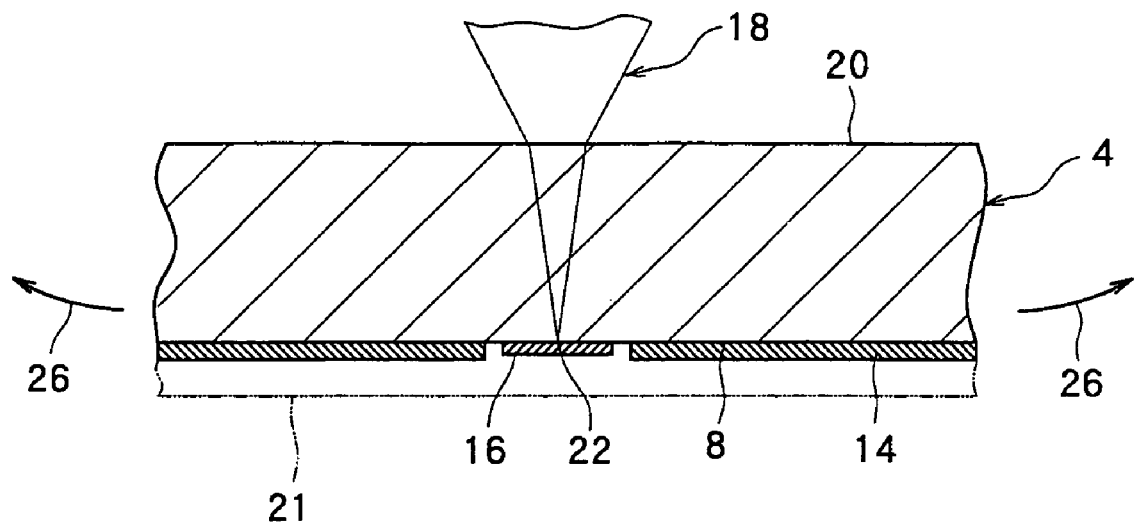
FIG. 3 is a schematic sectional view showing the mode of applying a laser beam to a semiconductor substrate in a preferred embodiment of the method of the present invention.

The method of the present invention relates to dividing the above-described semiconductor wafer 2 along the street 10 by utilizing a laser beam. FIG. 3 schematically shows the mode of applying a laser beam 18 to the semiconductor substrate 4. In the illustrated embodiment, the semiconductor substrate 4 is placed invertedly, i.e. facedown. That is, the face 8, where the circuits 14 are formed, is pointed downward, while a back 20 is pointed upward. Advantageously, as shown by a double-dotted chain line in FIG. 3, a protective tape 21, formed from a suitable plastic film such as a polyethylene film, is stuck onto the face 8 of the semiconductor substrate 4 where the circuits 14 are formed. The laser beam 18 is applied from beside the back 20 of the semiconductor substrate 4, namely, from above in FIG. 3. To avoid, if possible, the irregular reflection of the laser beam 18 from the back 20 of the semiconductor substrate 4, the back 20 of the semiconductor substrate 4 is preferably polished to a mirror surface having a surface roughness Ra, as defined by JIS B0601, of 0.05 μm or less. It is important for the laser beam 18 to be capable of passing through the semiconductor substrate 4. Particularly when the semiconductor substrate 4 is formed from silicon, the laser beam 18 is preferably a pulse laser beam having a wavelength of 800 to 1,500 nm, especially, a YVO4 pulse laser beam having a wavelength of 1,064 nm, or a YAG pulse laser beam similarly having a wavelength of 1,064 nm.

Figure 4:
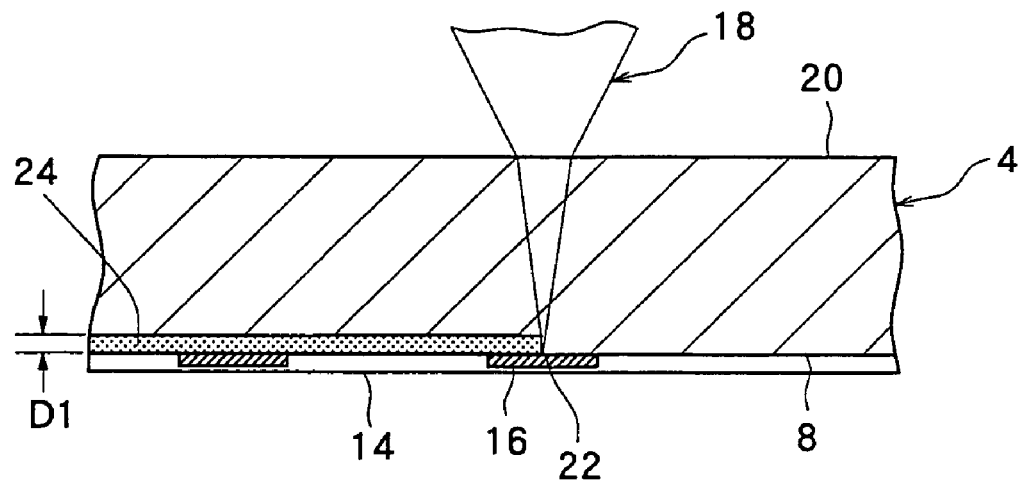
FIG. 4 is a schematic sectional view showing the mode of FIG. 1 by a section along a street.

With reference to FIG. 4 along with FIG. 3, the laser beam 18 applied from the back 20 of the semiconductor substrate 4 via a suitable optical system (not shown) is focused onto the face 8 of the semiconductor substrate 4 or its vicinity, for example, onto a site on the face 8 of the semiconductor substrate 4, or onto a position within the range of +10 μm to −10 μm from the face 8 when measured inwardly in the thickness direction (i.e. upwardly in FIG. 3). In this case, a zone ranging from the face 8 to a predetermined depth D1 in the semiconductor substrate 4 is deteriorated. If the semiconductor substrate 4 is formed from silicon, the deterioration is substantially melting. The peak power density of the pulse laser beam 18 at its focused spot 22 depends on the material for the semiconductor substrate 4, but generally, it is preferred that the peak power density is $1 \times 10^9$ W/cm$^2$. When the semiconductor substrate 4 and the laser beam 18 are relatively moved along the street 10, the zone ranging from the face 8 to the depth D1 of the semiconductor substrate 4 is gradually deteriorated in accordance with the relative movement. If the semiconductor substrate 4 is formed from silicon, it is gradually melted and resolidified. If there is the metal film 16 (or low dielectric constant film) disposed on the street 10, it is preferred to adjust the application of the laser beam 18 so that the metal film 16 (or low dielectric constant film) will also have at least a portion in the thickness direction deteriorated, although this is not necessarily required. If the semiconductor substrate 4 and the laser beam 18 are relatively moved over the entire length of a particular street 10, a deterioration zone 24 extends substantially continuously along such a particular street 10, or a multiplicity of the deterioration zones 24 are present with some spacing along the particular street 10.

According to our experience, when the laser beam 18 is applied from beside the face 8 of the semiconductor substrate 4 and focused on the face 8 of the semiconductor substrate 4 or its vicinity, the material for the semiconductor substrate 4 is melted away on the face 8 of the semiconductor substrate 4. Thus, so-called debris tends to be produced, contaminating the circuits 14 formed in the rectangular regions 12 on the face 8 of the semiconductor substrate 4. When the laser beam 18 is applied from beside the back 20 of the semiconductor substrate 4 and focused on the face 8 of the semiconductor substrate 4 or its vicinity, on the other hand, removal of the material is markedly suppressed, and the occurrence of debris, if any, is slight. The material is melted, and then resolidified. The reason for such phenomena is not necessarily clear, but we speculate as follows:

When the laser beam 18 is applied from beside the face 8 of the semiconductor substrate 4 and focused on the face 8 of the semiconductor substrate 4 or its vicinity, the power of the laser beam 18 is distributed outward from the face 8 of the semiconductor substrate 4. When the laser beam 18 is applied from beside the back 20 of the semiconductor substrate 4 and focused on the face 8 of the semiconductor substrate 4 or its vicinity, by contrast, the power of the laser beam 18 is distributed inwardly from the face 8 of the semiconductor substrate 4. As a result, the deterioration zone 24 develops inwardly from the face 8. If the protective tape 21 is stuck onto the face 8 of the semiconductor substrate 4, scatter of debris, if any, is physically limited to the vicinity of the focused spot by the protective tape 21.

Figure 5:
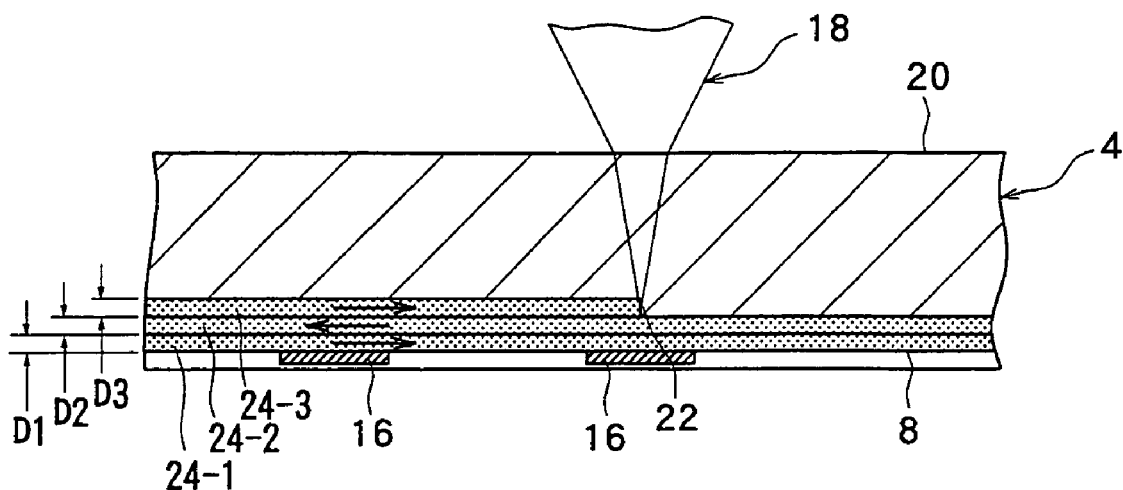
FIG. 5 is a schematic sectional view, similar to FIG. 4, showing the mode of generating deterioration zones (melting/resolidification zones) superposed in the thickness direction of the semiconductor substrate.

In the above-described manner, the deterioration zone 24 extending continuously, or the deterioration zones 24 present in large numbers at slight intervals, in the region ranging from the face 8 to the depth D1 of the semiconductor substrate 4 is or are generated throughout the length of the particular street 10. In this case, the strength of the material is locally decreased in the deterioration zone 24. Thus, a weakened zone extends substantially continuously, or may weakened zones exist at slight intervals, along the particular street 10. In this situation, an external force is exerted on the semiconductor substrate 4 to generate tensile stress in directions indicated by arrows 26 in FIG. 3, for example. By so doing, the semiconductor substrate 4 can be broken along the particular street 10. However, to break the semiconductor substrate 4 along the street 10 sufficiently precisely and sufficiently easily, it is important to make the thickness of the deterioration zone 24, i.e. the dimension of the deterioration zone 24 in the thickness direction of the semiconductor substrate 4, relatively large. To increase the thickness of the deterioration zone 24, it is permissible to apply the laser beam 18 a plurality of times, while displacing the focused point 22 of the laser beam 18. FIG. 5 shows the mode of generating the deterioration zones 24 superposed in the thickness direction of the semiconductor substrate 4, by moving the laser beam 18 rightward relative to the semiconductor substrate 4, with the focused spot 22 of the laser beam 18 being located initially at the face 8 of the semiconductor substrate 4 or its vicinity, thereby generating a deterioration zone 24-1 of the depth D1 along the street 10; then moving the laser beam 18 leftward relative to the semiconductor substrate 4, with the focused spot 22 of the laser beam 18 being displaced upward by a predetermined distance (D1), thereby generating a deterioration zone 24-2 of a depth D2 on the top of the deterioration zone 24-1; and moving the laser beam 18 rightward relative to the semiconductor substrate 4, with the focused spot 22 of the laser beam 18 being further displaced upward by a predetermined distance (D2), thereby generating a deterioration zone 24-3 of a depth D3 on the top of the deterioration zone 24-2.

Figure 6:
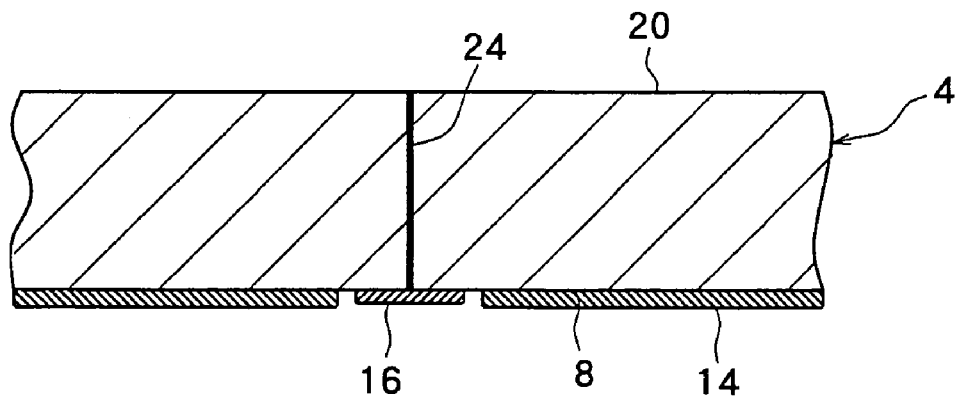
FIG. 6 is a schematic sectional view showing a state in which the deterioration zone (melting/resolidification zone) is generated throughout the thickness of the semiconductor substrate.
Figure 7:
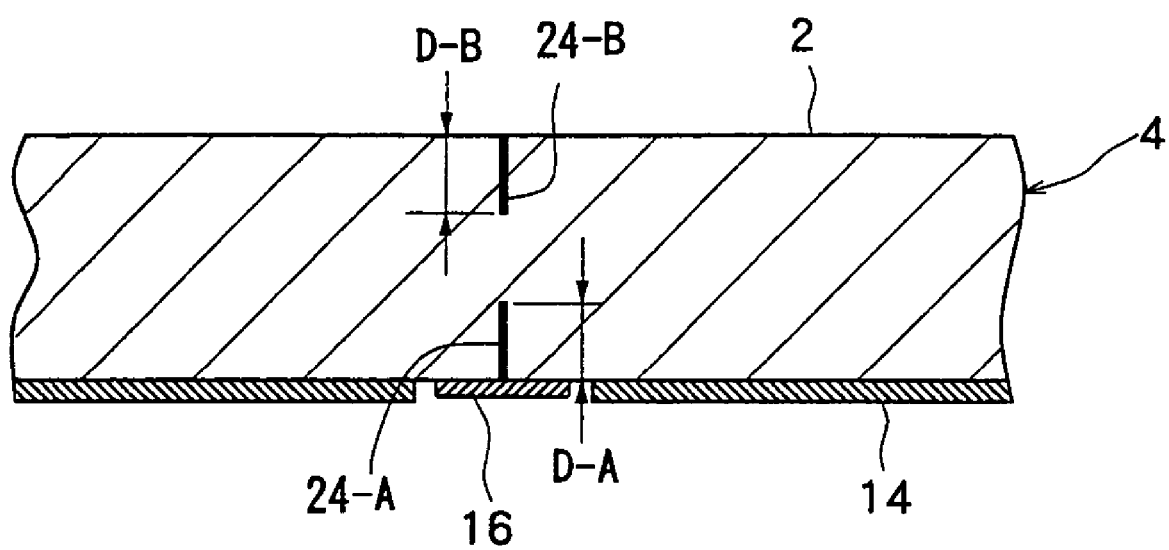
FIG. 7 is a schematic sectional view showing a state in which the deterioration zone (melting/resolidification zone) is generated on each of the face side and the back side of the semiconductor substrate.

Our experiments have confirmed that when the method explained with reference to FIG. 5 is repeatedly performed to generate the deterioration zone 24 throughout the thickness of the semiconductor substrate 4 as shown in FIG. 6, the semiconductor substrate 4 can be broken along the street 10 sufficiently precisely and sufficiently easily. To produce the deterioration zone 24 throughout the thickness of the semiconductor substrate 4, however, it is necessary to repeat the displacement of the focused spot of the laser beam 18 and the movement of the laser beam 18 relative to the semiconductor substrate 4 a multiplicity of times, thus requiring a relatively long time. Our experiments have also confirmed that when a deterioration zone 24-A is generated in a zone ranging from the face 8 of the semiconductor substrate 4 to a depth D-A, and a deterioration zone 24-B is generated in a zone ranging from the back 20 of the semiconductor substrate 4 to a depth D-B, as shown in FIG. 7, the semiconductor substrate 4 can be broken along the street 10 sufficiently precisely and sufficiently easily, without the need to form the deterioration zone 24 throughout the thickness of the semiconductor substrate 4. If the thickness of the semiconductor substrate 4 is assumed to be T, it is preferred that the depth of the deterioration zone 24-A is 0.20T to 0.50T, and the depth of the deterioration zone 24-B is similarly 0.20T to 0.50T. Assume, on the other hand, that in compliance with the disclosures of the aforementioned U.S. Pat. No. 6,211,488 and Japanese Patent Application Laid-Open No. 2001-277163, the deterioration zone is produced only in the intermediate portion, in the thickness direction, of the semiconductor substrate; in other words, the deterioration zone is not exposed at the face and back of the semiconductor substrate. In this case, breakage does not proceed sufficiently precisely along the street in the vicinity of the face and/or the back of the semiconductor substrate, with the result that chipping tends to occur on the face and/or back, as stated earlier.

In the above-described embodiment, the laser beam 18 is applied from beside the back 20 of the semiconductor substrate 4, and focused on the face 8 of the semiconductor substrate 4 or its vicinity. Particularly when the metal film 16, which reflects the laser beam 18, is not formed on the street 10, the laser beam 18 can be applied from beside the face 8 of the semiconductor substrate 4, and focused on the back of the semiconductor substrate 4 or its vicinity.

Next, examples of the present invention and a comparative example will be described below.

EXAMPLE 1

A semiconductor wafer of a configuration as shown in FIGS. 1 and 2 was prepared. The diameter (measured except for the site of the straight edge) of the semiconductor substrate was 8 inches (20.34 mm), and its thickness was 500 μm. The surface roughness Ra of the back of the semiconductor substrate was 0.05 μm. In accordance with the mode illustrated in FIG. 5, a laser beam was applied from beside the back of the semiconductor substrate, the semiconductor substrate was moved along the street, with the focused spot of the laser beam being initially located on the face of the semiconductor substrate. Then, the focused spot of the laser beam was raised upward by 50 μm for each movement of the semiconductor substrate, and the semiconductor substrate was moved along the street a total of 10 times. In this manner, a melted, resolidified zone was formed in 10 layers stacked sequentially. The laser beam used was as follows:

Laser: YVO4 pulse laser
Wavelength: 1064 nm
Spot diameter of focused spot: 1 μm
Pulse width: 25 ns
Peak power density of focused spot: $1.5 \times 10^{10}$ W/cm$^2$
Pulse repetition frequency: 100 kHz
Feed speed of semiconductor substrate: 100 mm/s Then, both sides of the street on the face of the semiconductor substrate were supported by a pair of bearers placed 7 mm apart, and a slender breaking member having a semicircular front end with a radius of 0.03 mm was lowered from the back of the semiconductor substrate toward a central portion of the street at a rate of 1 mm/s to break the semiconductor substrate along the street. When the broken semiconductor substrate was observed, the semiconductor substrate was broken along the street sufficiently precisely, and no chipping was found. Melting and resolidification upon exposure to the laser beam covered substantially the entire thickness of the semiconductor substrate, as shown in FIG. 6. Deterioration of the metal film was also noted.

EXAMPLE 2

The thickness of the semiconductor substrate in the semiconductor wafer prepared was 625 μm, and no metal film was disposed on the street. The semiconductor substrate was moved along the street, with the focused spot of the laser beam applied being initially located at the face of the semiconductor substrate. Then, the semiconductor substrate was moved twice along the street, with the focused spot of the laser beam being raised by 50 μm for each movement. In this manner, a melted, resolidified zone was formed in 3 layers stacked on the face side of the semiconductor substrate. Then, the semiconductor substrate was moved along the street, with the focused spot of the laser beam being raised by 325 μm. Then, the semiconductor substrate was moved twice along the street, with the focused spot of the laser beam being further raised by 50 μm for each movement. In this manner, a melted, resolidified zone was formed in 3 layers stacked on the back side of the semiconductor substrate. With the exception of these facts, the same procedure as in Example 1 was performed, and the semiconductor substrate was broken along the street. Observation of the broken semiconductor substrate showed that the semiconductor substrate was broken along the street sufficiently precisely, and no chipping took place. Melting and resolidification upon application of the laser beam were as shown in FIG. 7. The thickness of the face-side melted, resolidified zone exposed at the face was about 150 μm (about 24% of the entire thickness), and the thickness of the back-side melted, resolidified zone exposed at the back was also about 150 μm (about 24% of the entire thickness).

COMPARATIVE EXAMPLE

The semiconductor substrate was moved along the street, with the focused spot of the laser beam applied being initially located at a position 100 μm above the face of the semiconductor substrate. Then, the semiconductor substrate was moved 5 times along the street, with the focused spot of the laser beam being raised by 50 μm for each movement. In this manner, six melted, resolidified layers were formed as a laminated structure. With the exception of these facts, the same procedure as in Example 2 was performed, and the semiconductor substrate was broken along the street. Observation of the broken semiconductor substrate showed that a plurality of sites, where breakage progressed while deviating from the street, were present on the face and back of the semiconductor substrate. A melted, resolidified zone existed only in an intermediate portion, in the thickness direction, of the semiconductor substrate without reaching the face or back of the semiconductor substrate. The thickness of the melted, resolidified zone was about 300 μm.

What we claim is:

1. A dividing method for dividing a semiconductor wafer along a street, said semiconductor wafer being composed of a semiconductor substrate with a back and a face on which a plurality of rectangular regions are demarcated by a plurality of said streets arranged in a lattice pattern, and a circuit is formed in each of said rectangular regions, said dividing method comprising:
applying a laser beam from either said back or said face of said semiconductor substrate and (i) focusing said laser beam onto said face, or a vicinity, thereof to partially deteriorate a first zone to a predetermined depth from said face toward said back, and (ii) focusing said laser beam onto said back or a vicinity thereof to partially deteriorate a second zone to a predetermined depth from said back toward said face;
relatively moving said semiconductor substrate and said laser beam along said street; and
exerting an external force on said semiconductor substrate to break said semiconductor substrate along said street.

2. The dividing method according to claim 1, wherein said semiconductor substrate is formed from silicon, and said deterioration is substantially melting and resolidification.

3. The dividing method according to claim 1, further comprising displacing a focused spot of said laser beam in a thickness direction of said semiconductor wafer to increase a thickness of either deteriorated zone.

4. The dividing method according to claim 3, wherein if a thickness of said semiconductor substrate is assumed to be T, said predetermined depth of said zones is in a range of 0.20 T to 0.50 T.

5. The dividing method according to claim 3, wherein a whole, in a thickness direction, of said semiconductor substrate is deteriorated.

6. The dividing method according to claim 1, further comprising applying said laser beam from beside said back of said semiconductor substrate and focusing said laser beam onto said face of said semiconductor substrate, or a vicinity of said face.

7. The dividing method according to claim 6, wherein a protective tape formed from a plastic film is stuck to said face of said semiconductor substrate.

8. The dividing method according to claim 6, wherein said back of said semiconductor substrate is a mirror surface having a surface roughness Ra, as defined by JIS B0601, of 0.05 μm or less.

9. The dividing method according to claim 6, wherein a laminated film, which is either a metal film or a low dielectric constant insulating film, is disposed at least in said street region on said face of said semiconductor substrate, and said laminated film is also deteriorated at least partially by said laser beam.

10. The dividing method according to claim 1, wherein said laser beam is a pulse laser beam having a wavelength of 800 to 1,500 nm.

* * * * *